Nov. 27, 1962
H. G. HAYES
3,065,737
HYDRAULIC TRACER VALVE CONTROL SYSTEMS
Filed March 18, 1960
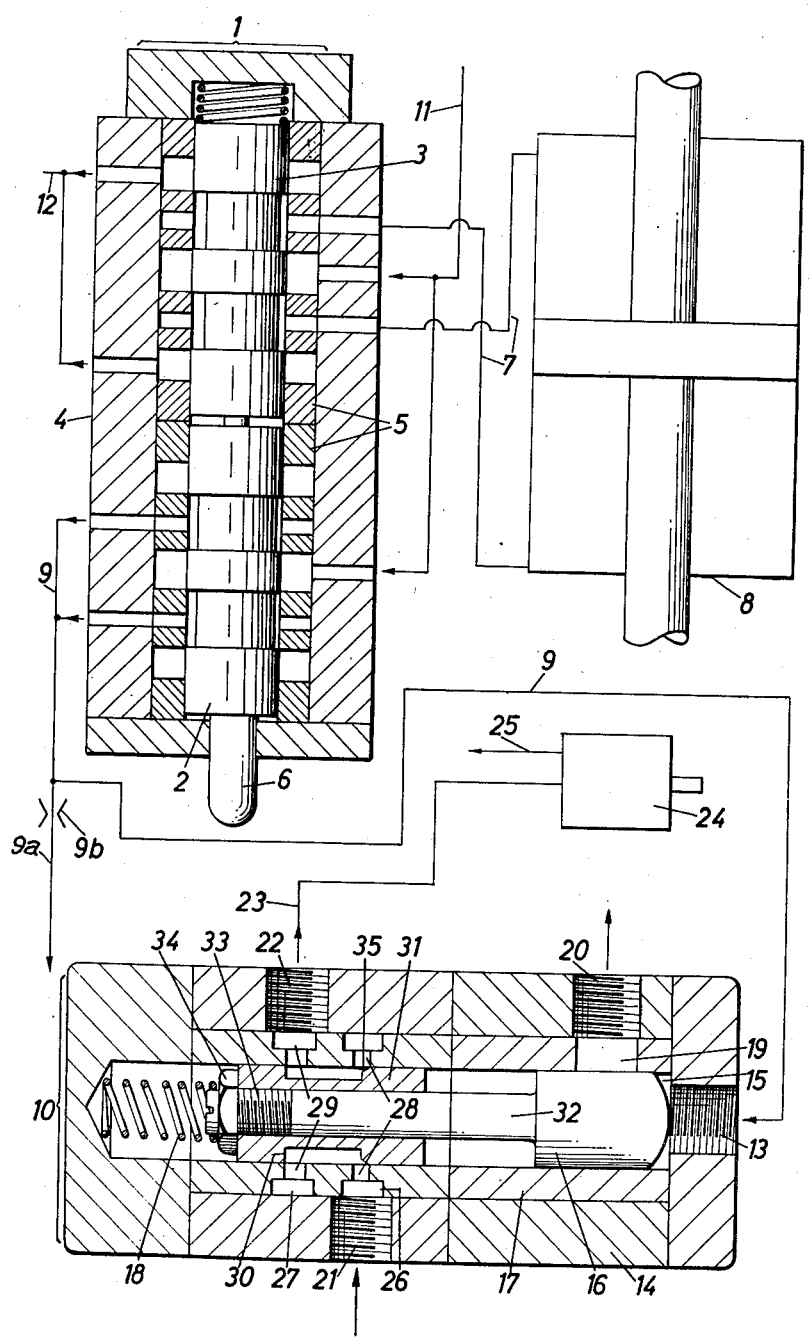

3,065,737
HYDRAULIC TRACER VALVE CONTROL
SYSTEMS
Hubert G. Hayes, Woodacre Crescent, Bardsey, England, assignor to Hayes Engineers (Leeds) Limited, Leeds, England, a British company
Filed Mar. 18, 1960, Ser. No. 16,043
Claims priority, application Great Britain Mar. 25, 1959
6 Claims. (Cl. 121—45)

This invention relates to hydraulic tracer valve control systems used for operating copying devices, hereinafter referred to as "copy machine tools."

Tracer valve control systems are often used in controlling the operation of a hydraulic motor, such as a piston and cylinder unit, used for operating some part of a copy machine tool to give a traversing or working movement. Various difficulties are experienced such as often a good degree of movement of the stylus is required to pass a sufficient flow of liquid to provide the required movement of a machine tool part, such as a worktable, work holder or tool.

The main object of this invention is to provide simple but efficient servo-valve means in a hydraulic control system or systems.

Accordingly there is provided control means for hydraulic operating systems, comprising a stylus operated tracer value unit controlling at least one hydraulic system connected with an associated servo-valve unit, said servo-valve unit being interposed in a pressurised hydraulic fluid system connected independently of the tracer valve unit from a pressure source to the operating means of a copy machine tool part, a valve member in the servo-value unit spring-loaded in one direction and oppositely acted upon by the hydraulic tracer controlled system, the whole arrangement being such that deflections of the stylus will cause its associated valve member to hydraulically control the servo-valve unit and cause the latter to automatically control the flow of pressurised fluid through the servo-valve unit to the said operating means and thus the movement of the tool part.

The hydraulic control system between the tracer valve unit and servo-valve unit may exhaust to the hydraulic pressure supply source.

The invention also includes control means for hydraulic operating systems, comprising a tracer valve unit including a pair of aligned ported valve members in a ported housing and both controlled by a common stylus one of said valve members being adapted to control at least one hydraulic motor, the other valve member being adapted to control a servo-valve unit in opposition to a resilient loading, and a pressurised hydraulic fluid system connected independent of the tracer valve unit through said servo-valve unit from a pressure feed source to another motor for controlling it.

The servo-valve unit valve member may be spring-loaded to a normal set position to provide a constant basic flow, which flow is variable inversely in relation to hydraulic pressure from the tracer valve unit.

Moreover, when a stylus-controlled double tracer valve unit is employed its two valve members may be in direct mechanical engagement and such members may be of different diameters or porting sizes, with one member connected to or engaged by the stylus and controlling the servo-valve unit.

The invention will be particularly described with reference to the accompanying drawing.

In the illustrated embodiment of this invention for a copy machine tool having two tracer valve controlled hydraulically operated parts, a hydraulic tracer valve unit 1 is provided including two piston-type valve members 2 and 3 in mechanical engagement within a ported housing 4, said two valve members each working in a ported lining 5. The lower valve member 2 is adapted to be operated by a stylus 6 in any known manner. The upper valve member 3 is arranged to be connected by a hydraulic control system 7 to a hydraulic motor 8, i.e., a piston-cylinder unit, and this may operate the tool or say the machine table for depth control of cutting and the lower valve member 2 has a control system 9 leading to a servo-valve unit 10. A pressurised feed line 11 leads to both tracer valves with exhaust line 12 leading therefrom. The system 9 has a discharge pipe 9a leading back to the fluid supply tank with a restricted part or passage 9b located in the return pipe 9a.

The said lower tracer valve member 2 has its pressure line 9 leading to an inlet 13 to the servo unit housing 14 and such inlet may be adapted to be closed by the domed end 15 of the servo-valve member 16 which is then in its normal position. The tracer valve member 2 controlling such feed to said inlet 13 may be furnished with no overlap.

The aforesaid servo-valve unit 10 comprises a ported housing 14, conveniently built of sections, including a ported cylinder liner 17, and within this housing and liner is arranged the piston-type valve member 16. This member is spring-loaded by a compressed helical spring 18 from the end opposite to the hydraulic fluid inlet 13 to which the tracer valve system 9 is connected, say by a screwed-in union. This servo-valve is thus spring-loaded to a set position, and fluid in the pressurised system inlet 13 will operate against the end part 15 of the valve 16, and when such valve is displaced, the fluid pressure from system 9 is exhausted through a slot 19 in the liner 17 and port 20 in the housing 14 to the usual supply tank (not shown) from which the fluid is drawn. The end 15 of valve 16 is shaped and positioned relative to the slot 19 so that fractional movement will uncover the leading end of the slot and proportional flow from inlet 13 to exhaust port 20 will commence. The housing also is furnished with a pressurised hydraulic fluid inlet 21 independent of the tracer valve supply and an outlet 22 connected by pipe 23 to a hydraulic motor 24, e.g. a piston and cylinder unit, which can be connected to a copy machine tool traversing part, e.g. a worktable, with an exhaust line 25 leading from the motor to the supply tank. Communication between the inlet 21 and outlet 22 is through the annular ports 26, 27, holes 28, 29, and annular port 30 in the bobbin-like part 31 of the servo-valve member 16. The part 31 is a neat fit on the spindle 32 and screw-threaded at its outer end to be screwed along the screw-threaded end 33 of the spindle for axial setting purposes. A lock nut 34 secures the part 31 and the spring 18 bears on to the nut. Thus the ported part 31 controls the pressure inlet 21. This servo-valve part 31 is "landed" to suit requirements, and is shown tapered (it may be otherwise shaped off) on its edge 35 controlling the inlet.

With the above arrangement the servo-valve unit 10 may be so arranged that when there is no hydraulic pressure at the inlet 13 on the end 15 of the servo-valve 16 a given fluid pressure flows through the servo-valve from inlet 21 to give a required speed of traverse. Thus when the tracer valve is operated, pressure, or an increased pressure, will act upon the end 15 of the servo-valve to move it axially and allow a proportional flow to exhaust through outlet 20 and thus reduce the pressure through port 30, or when required arrest such pressure, and thus contol the hydraulic traversing motor 24 to either decrease its speed or arrest the traverse. Thus mechanical pressure of stylus 6 on valve 2 is the inverse of hydraulic pressure through the valve unit 10 for operating the motor 24.

It will be understood the construction may be modified in some ways according to requirements and that the servo and tracer valve units may be used for some other control purposes, particularly on copy machine tools.

What I claim is:

1. In a hydraulic control system the combination comprising a stylus operated tracer valve including inlet and outlet portings, a hydraulic fluid pressure actuated operated means, a servo valve unit, said servo valve unit including a servo valve member having a piston portion slidable within a cylinder, inlet and outlet portings and an exhaust port all of which are controlled by movement of said servo valve member, spring means loading said servo valve member to a set position in one direction and an inlet port to said cylinder for applying pressurized fluid to said piston portion to move said servo valve member in the opposite direction from said set position, a source of pressurized hydraulic fluid, first conduit means extending from said pressurized fluid source through said inlet and outlet portings in said tracer valve to said cylinder inlet port in said servo valve unit for actuating said servo valve member from said set position to control fluid flow through said inlet and outlet portings in said servo valve unit, said pressurized fluid being exhausted from said cylinder through said exhaust port, and second conduit means extending from said pressurized fluid source through said inlet and outlet portings in said servo valve unit to said fluid pressure actuated operating means.

2. The invention as defined in claim 1 wherein said exhaust port from said cylinder of said servo valve unit is normally closed when said servo valve member occupies its set position and is variably opened in response to the fluid pressure applied against the piston portion thereof.

3. The invention as defined in claim 2 wherein said exhaust port is elongated in the direction of movement of said servo-valve member.

4. The invention as defined in claim 1 wherein said servo-valve member includes an adjustable ported part adapted for adjustment in relation to hydraulic pressure porting independently of the position of said servo-valve member in relation to exhaust porting for fluid pressure from said tracer valve unit.

5. The invention as defined in claim 4 wherein said adjustable ported part of said servo-valve member is constituted by a bobbin-like element which is axially adjustable on a spindle portion of said servo-valve member.

6. The invention as defined in claim 1 wherein the spring loading on said servo-valve member is such as to normally provide a constant basic flow of said pressurized hydraulic fluid from said pressure source to said operating means, said pressurized hydraulic fluid flow being variable inversely in relation to the variation in hydraulic pressure from said tracer valve unit.

References Cited in the file of this patent

UNITED STATES PATENTS

| | | |
|---|---|---|
| 1,287,258 | Discher | Dec. 10, 1918 |
| 2,470,471 | Carleton | May 17, 1949 |
| 2,565,600 | Esterline | Aug. 28, 1951 |
| 2,704,956 | Johnson | Mar. 29, 1955 |
| 2,726,581 | Roehm | Dec. 13, 1955 |
| 2,735,342 | Glasser | Feb. 21, 1956 |
| 2,791,885 | Sassen | May 14, 1957 |
| 2,958,501 | Pickett et al. | Nov. 1, 1960 |

FOREIGN PATENTS

| | | |
|---|---|---|
| 137,439 | Sweden | Sept. 23, 1952 |